US011709225B2

(12) United States Patent
Bekooij et al.

(10) Patent No.: US 11,709,225 B2
(45) Date of Patent: Jul. 25, 2023

(54) COMPRESSION OF DATA EMPLOYING VARIABLE MANTISSA SIZE

(71) Applicant: NXP B.V., Eindhoven (NL)

(72) Inventors: Marco Jan Gerrit Bekooij, Empel (NL); Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 246 days.

(21) Appl. No.: 16/906,655

(22) Filed: Jun. 19, 2020

(65) Prior Publication Data

US 2021/0396840 A1 Dec. 23, 2021

(51) Int. Cl.
  *G01S 7/35* (2006.01)
  *G01S 13/90* (2006.01)
  *G01S 7/40* (2006.01)
  *G01S 13/72* (2006.01)

(52) U.S. Cl.
  CPC ............ *G01S 7/354* (2013.01); *G01S 7/4056* (2013.01); *G01S 13/723* (2013.01); *G01S 13/9047* (2019.05); *G01S 7/356* (2021.05)

(58) Field of Classification Search
  CPC .... G01S 7/354; G01S 13/9047; G01S 7/4056; G01S 13/723; G01S 7/356
  USPC ......................................................... 342/128
  See application file for complete search history.

(56) References Cited

U.S. PATENT DOCUMENTS

| 3,965,342 | A | * | 6/1976 | Constant | G06F 17/142 708/404 |
| 4,357,607 | A | * | 11/1982 | Van der Heijden | G06F 17/18 342/197 |
| 4,472,717 | A | * | 9/1984 | Eaves | G01S 7/024 342/201 |
| 4,513,288 | A | * | 4/1985 | Weathers | G01S 13/288 342/201 |
| 4,710,772 | A | * | 12/1987 | Cantwell | H03G 3/3052 342/194 |
| H484 | H | * | 6/1988 | Holliday | G01S 7/28 332/119 |
| 4,787,055 | A | * | 11/1988 | Bergeon | G06F 17/142 708/409 |
| 4,801,939 | A | * | 1/1989 | Jones | G01S 13/90 342/194 |

(Continued)

OTHER PUBLICATIONS

Liang Li. "Embedded Data Compression in Automotive FMCW Radar System," Master of Science Thesis, Computer Architecture for Embedded System Group, University Twenty (Jul. 2014).

(Continued)

*Primary Examiner* — Nuzhat Pervin

(57) ABSTRACT

Exemplary aspects are directed to or involve a radar transceiver to transmit signal and receive reflected radar signals via a communication channel. The exemplary method includes radar receiver data processing circuitry that may be used to differentiate a subset of representations of the received signals. This differentiation may be used to select signals that are more indicative of target(s) having a given range than other ones of the received signals. The received signal's representations may then be compressed by using variable-mantissa floating-point numbers having mantissa values that vary based, at least in part, on at least one strength characteristic of the respective representations.

20 Claims, 5 Drawing Sheets

(56) References Cited

U.S. PATENT DOCUMENTS

| | | | | |
|---|---|---|---|---|
| 5,933,360 | A * | 8/1999 | Larson | G06F 7/4833 |
| | | | | 708/512 |
| 6,707,416 | B2 * | 3/2004 | Ishii | G01S 13/931 |
| | | | | 342/72 |
| 7,394,410 | B1 * | 7/2008 | Wegener | H03M 7/30 |
| | | | | 341/61 |
| 8,301,803 | B2 * | 10/2012 | Wegener | H03M 7/40 |
| | | | | 708/203 |
| 8,959,129 | B2 * | 2/2015 | Wegener | H03M 7/30 |
| | | | | 708/203 |
| 8,972,033 | B2 * | 3/2015 | Srinivasan | G10L 19/018 |
| | | | | 700/94 |
| 9,047,118 | B2 * | 6/2015 | Wegener | G06F 7/483 |
| 9,104,473 | B2 * | 8/2015 | Wegener | G06F 7/483 |
| 9,104,474 | B2 * | 8/2015 | Kaul | G06F 7/5443 |
| 9,448,300 | B2 * | 9/2016 | Jansen | G01S 13/34 |
| 9,575,184 | B2 * | 2/2017 | Gilliland | G01S 17/10 |
| 9,584,432 | B2 * | 2/2017 | Welin | H04L 47/50 |
| 9,778,909 | B2 * | 10/2017 | Samudrala | G06F 7/483 |
| 9,946,687 | B2 * | 4/2018 | Lerner | G06F 17/142 |
| 10,616,016 | B2 * | 4/2020 | Fertonani | H04L 69/40 |
| 10,690,744 | B1 * | 6/2020 | Uzes | G01S 3/8006 |
| 10,861,217 | B2 * | 12/2020 | Moloney | G06T 15/06 |
| 10,877,124 | B1 * | 12/2020 | Uzes | G01S 3/043 |
| 11,169,775 | B2 * | 11/2021 | Bates | G06F 7/5235 |
| 2007/0229340 | A1 * | 10/2007 | Krishnamoorthi | H03G 3/3089 |
| | | | | 341/155 |
| 2010/0109938 | A1 * | 5/2010 | Oswald | G01S 13/522 |
| | | | | 707/E17.014 |
| 2013/0060827 | A1 * | 3/2013 | Wegener | H03M 7/46 |
| | | | | 708/203 |
| 2016/0033631 | A1 * | 2/2016 | Searcy | G01S 13/931 |
| | | | | 342/132 |
| 2017/0054449 | A1 * | 2/2017 | Mani | H03M 7/4031 |
| 2017/0097405 | A1 * | 4/2017 | Lerner | G01S 13/583 |
| 2017/0153316 | A1 * | 6/2017 | Wintermantel | H03M 7/24 |
| 2017/0220522 | A1 * | 8/2017 | Lerner | G06F 17/142 |
| 2017/0293025 | A1 * | 10/2017 | Davis | G01S 7/023 |
| 2019/0041494 | A1 * | 2/2019 | Roger | G01S 13/87 |
| 2021/0064338 | A1 * | 3/2021 | Emmart | G06F 7/483 |
| 2021/0110508 | A1 * | 4/2021 | Mellempudi | G06T 1/20 |
| 2021/0118217 | A1 * | 4/2021 | Moloney | G06T 1/20 |
| 2021/0209388 | A1 * | 7/2021 | Ciftci | G06V 40/45 |

OTHER PUBLICATIONS

NXP Semiconductors. S32R274 Reference Manual, Rev 3.1, Jul. 2017, Chapters 45-49, pp. 1765-2316 (Jul. 2017).

* cited by examiner

US 11,709,225 B2

COMPRESSION OF DATA EMPLOYING VARIABLE MANTISSA SIZE

OVERVIEW

Aspects of various embodiments are directed to radar transceiver systems having circuitry to identify targets in a noise environment and methods for reducing memory requirements in such a system by compressing, via variable size mantissas, processed and stored receiver data.

In radar systems, accurately discerning targets from noise is important. This is often achieved using signal processing circuitry which may involve, among other techniques, compressing circuitry and/or processing transform circuits such as Fast Fourier Transforms (FFTs) and memory storage of the resulting data. In methods computing such items as range and velocity of targets, memory requirements may become excessive. This memory may occupy a large integrated circuit (IC) area and it is therefore also very costly to integrate on the same IC as processors and other required circuitry. Furthermore, the large memory may result in a high leakage power which results in expensive packages and heat sinks to keep the IC temperature low enough. While aspects of the present disclosure have been shown to be beneficial when used in the context of such received FMCW radar signals and while the following discussion uses this context as examples to understand such aspects, the present disclosure is not necessarily so limited.

These and other matters have presented challenges to cost and efficiencies of radar implementations, for a variety of applications.

SUMMARY

Various examples of the present disclosure are directed to issues such as those addressed above and/or others which may become apparent from the following disclosure concerning data compression in a radar transceiver system. Various more-detailed examples according to the present disclosure, not necessarily limited or directed to such issues, are characterized below.

In certain example embodiments, aspects of the present disclosure involve radar transceiver systems having circuitry to identify targets in a noise environment and methods for reducing memory requirements in such system by compressing data, via floating-point numbers having variable size mantissas, of the processed and stored received data.

In a more specific example, an embodiment is directed to or involve a radar transceiver to transmit signal and receive reflected radar signals via a communication channel. An exemplary method in this context includes data processing circuitry (e.g., in the radar receiver) that may be used to differentiate a subset of representations of the received signals. This differentiation may be used to select signals that are more indicative of target(s) having a given range than other ones of the received signals. The received signal's representations may then be compressed by using variable-mantissa floating-point numbers having mantissa values that vary based, at least in part, on at least one strength characteristic (e.g., amplitude, SNR, peak, etc.) of the respective representations.

In another specific example embodiment, a radar receiver includes memory circuitry and transformation (e.g., FFT or other) circuitry to compress the representations and store the compressed representations in the memory circuitry. After sufficient data is collected velocity information, associated with the at least one target, may be discerned using the compressed data. The compressed representations may then be decompressed and used, along with a range-doppler map, to detect target(s).

Another specific example may involve a radar transceiver using a communication channel through which radar signals are transmitted and in response signals are received. Then differentiating a subset of representations of the received signals as being selected ones of the received signals that are more indicative of at least one target being with a given range than other ones of the received signals. Subsequently the representations may be compressed by using variable-mantissa floating-point numbers having mantissa values that vary based at least in part on at least one strength characteristic of the respective representations.

In another related example, such (radar-receiver) includes memory circuitry to compress the representations and store the compressed representations in range bins of the memory circuitry, wherein each of one or more variable-mantissa floating-point numbers has a one-bit having mantissa value associated with an exponent value that is shared by or common to multiple ones of the range bins for different chirps or chirp sequences The above discussion/summary is not intended to describe each embodiment or every implementation of the present disclosure. The figures and detailed description that follow also exemplify various example embodiments.

BRIEF DESCRIPTION OF FIGURES

Various example embodiments may be more completely understood in consideration of the following detailed description in connection with the accompanying drawings, in which.

Figure 1:
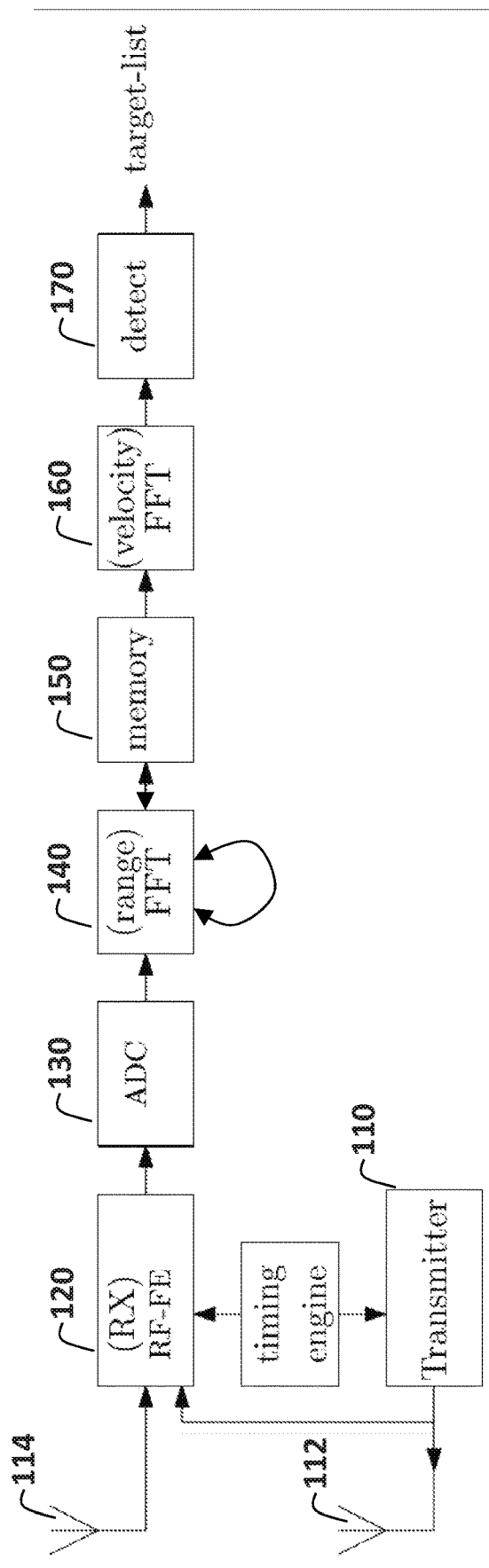
FIG. 1 is a block diagram illustrating an example of a Frequency-Modulated Continuous Wave (FMCW) radar system, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving circuits configured to process signals such as received FMCW radar signals (such as used in vehicle collision detection and autonomous driving assistance). Storing of the results of radar processed signals requires a significant amount of memory (typically megabytes of memory). This memory may occupy a relatively-large integrated circuit (IC) area and therefore may also be very costly to integrate on the same IC as processors and other required circuitry. Furthermore, the large memory may result in a high leakage power which results in expensive packages and heat sinks to keep the IC temperature low enough. While aspects of the present disclosure have been shown to be beneficial when used in the context of such received FMCW radar signals and while the following discussion uses this context as examples to understand such aspects, the present disclosure is not necessarily so limited.

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to a specific example of the instant disclosure, embodiments are directed to or involve a radar transceiver to, via a communication channel, transmit and receive radar signals. An exemplary radar receiver data processing circuitry may be used to differentiate a subset of representations of the received signals. This differentiation may be used to select signals that are more indicative of one or more targets being with a given range than other ones of the received signals. Representations of the received signals may then be compressed by using variable-mantissa floating-point numbers having mantissa values that vary based at least in part on at least one strength characteristic (e.g., amplitude, SNR, peak, etc.) of the respective representations. Using variable mantissa sizes may aid in, for example, reducing memory storage allocation size, reduction in IC size, lower power usage, reduced IC die temperature.

In a more specific example consistent with the present disclosure, a radar receiver data processing circuit may include FFT (Fast Fourier Transform) circuitry to compress the representations, using one or more strength characteristic including an amplitude assessment, a signal to noise assessment, or an assessment based on at least one peak parameter associated with the received signals.

In yet another specific example, a radar receiver may have memory circuitry and FFT circuitry to compress the representations and store the compressed representations in the memory circuitry. After sufficient data is collected velocity information, associated with the at least one target, may be discerned using the compressed data. The compressed representations may then be decompressed and used, along with a range-doppler map, to detect target(s).

Now turning to the drawing, FIG. 1 is a block diagram illustrating an example of a Frequency-modulated Continuous Wave (FMCW) radar system according to the present disclosure. The transmitter 110 produces a FMCW signal (e.g., 77 GHz) to be transmitted via the transmit antenna 112.

This signal may also contain frequency chirps and each chirp consists typically of a frequency ramp which is a sinusoidal signal with a linearly increasing frequency. The transmitted signal is reflected against targets and these reflections are received by the RX antenna(s) 114 of the radar systems. A beat signal with a low frequency may be obtained after mixing the received signal with the transmitted signal in the RX block 120. This beat signal may be digitized by an analog-to-digital converter (ADC) 130. The digitized beat signal may then be processed by an FFT 140 (or "range FFT"). Peaks which are produced from this FFT processing may correspond to targets at different ranges (e.g., distances) from the radar. For example, for an N point FFT, N output values may be produced, and each value may belong to one of the N FFT-bins. The output of each range FFT may be stored in memory 150. Note that storing of the results of the range FFT (first FFT) 140 may require a significant amount of memory (e.g., megabytes of memory). An array may be created by storing the range FFT results of a predefined number of chirps in memory 150. Each row in this array may contain the results of a single range FFT. After transposing this array, a second FFT 160 ("velocity FFT") may be computed on each row of the array. The results of this processing may be stored as an array in memory 150. This resulting array contains the so-called range-doppler map. Peaks in the amplitude in this range-Doppler map may correspond with targets with a certain range and velocity as discerns by the detect block 170.

Figure 2:
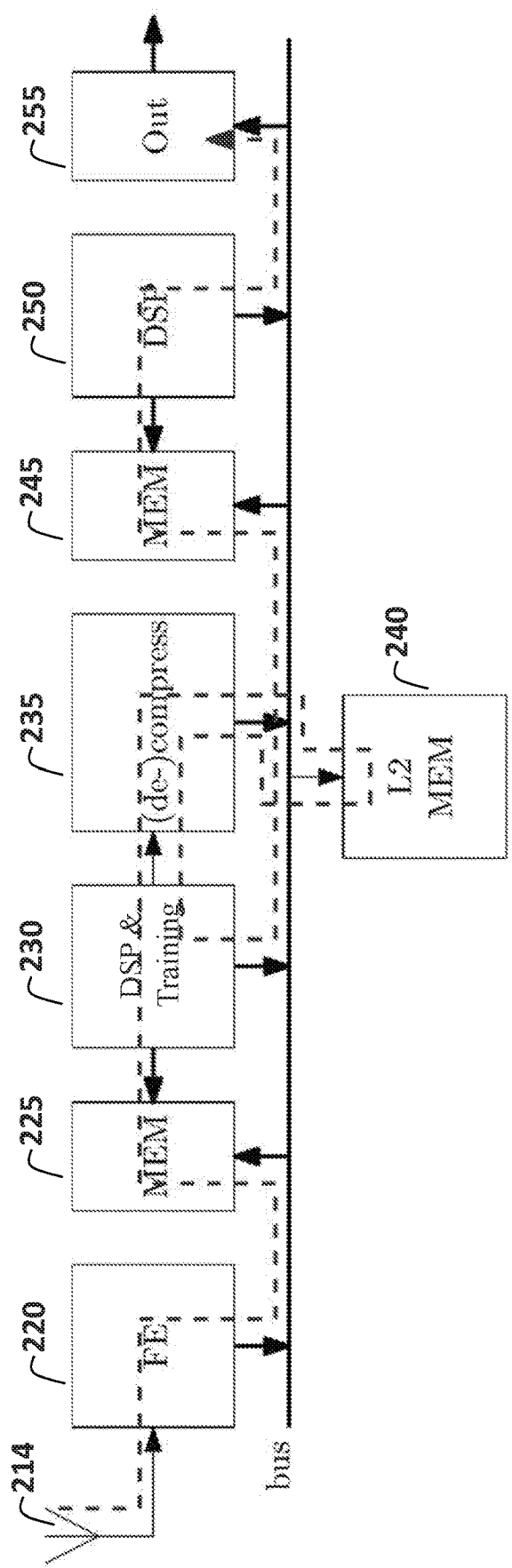
FIG. 2 is a block diagram illustrating an example of the flow of data in an FMCW radar system, in accordance with the present disclosure.

FIG. 2 illustrates an example block diagram of a hardware architecture of an FMCW radar system including the flow of the data (dashed line) through the system. The RF-frontend, labeled FE 220, transmits the chirps, and receives the reflections of the chirps and may down-mix the received signals into an analog beat signal. This beat signal may be digitized and sent to a Digital Signal Processor (DSP) 230. This processor may execute the range FFT function on each chirp and send its output to the compression unit 235.

The (de)compression unit 235 may apply lossy compression to the FFT representations using variable-mantissa floating-point numbers having mantissa values that vary based on strength characteristic. This data may then send the data to a large L2 memory 240. After all processed chirps of a chirp-train are received, the data may be fetched from the L2 memory 240. The address generation for this L2 memory 240 is such that array transposition takes place which is accomplished when the columns from the matrix are read whereas the data was stored in rows. After sufficient data for one velocity FFT is read, the data may be decompressed by the (de)compress block 235 and sent the DSP 250.

The DSP 250 may then execute a velocity FFT after which the range-doppler map is obtained. The DSP 250 may then use this range Doppler map to perform detection of objects. The list with detections is sent to a micro-processor which sends the data to an output interface 255. Note, in the discussion on FIG. 2 above, DSP blocks 230 and 250 may also be implemented in the same physical DSP. Similarly, memory blocks 225 and 245 may also be implemented in the same physical memory.

In another example, such circuitry does not use the shared bus as in FIG. 2 but rather data flow may occur on bus line groups which are more individualized/dedicated.

Figure 3:
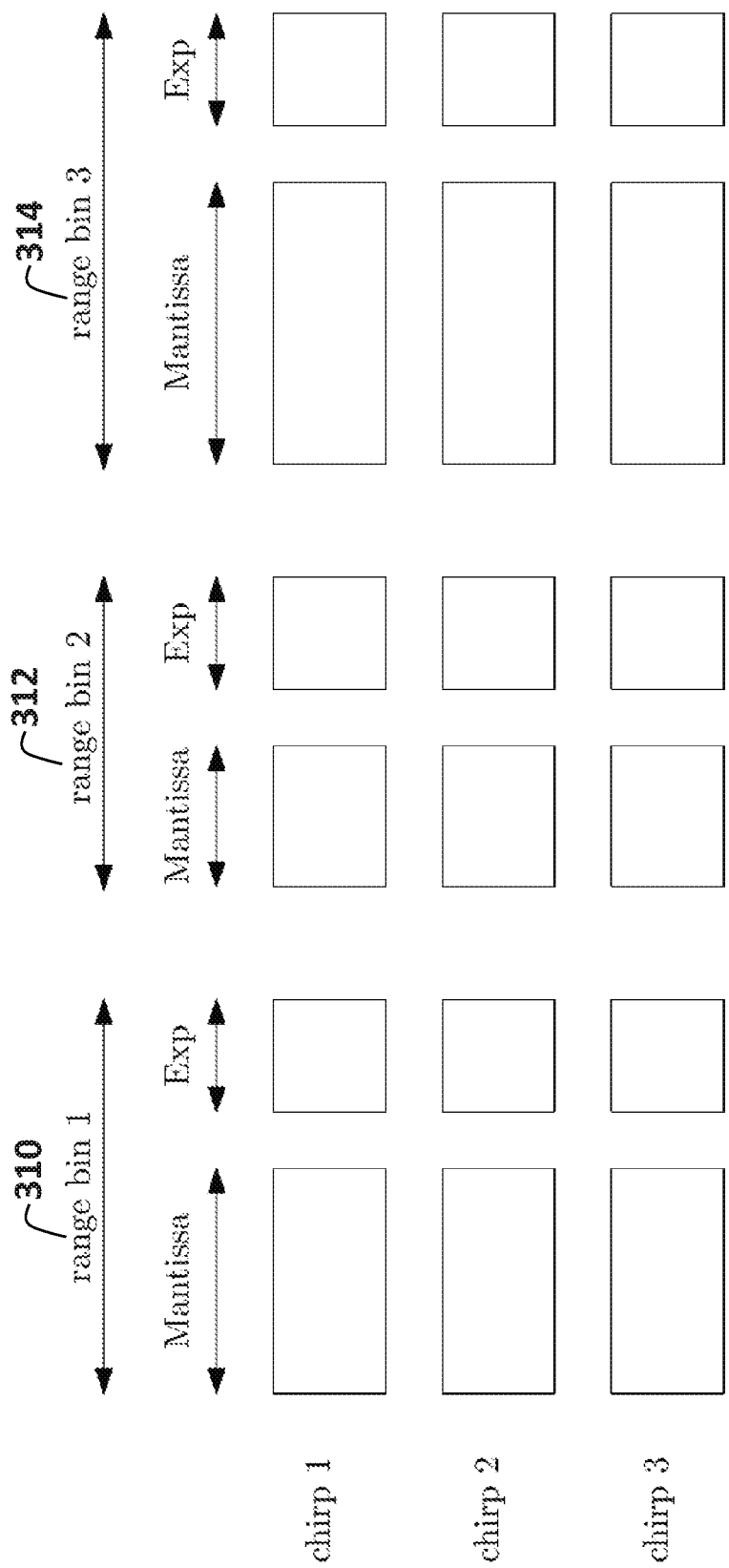
FIG. 3 is a block diagram illustrating an example of variable mantissa sizes applied to various range bins, in accordance with the present disclosure.

FIG. 3 is a block diagram illustrating an example of variable mantissa sizes applied to various range bins. As discussed above, compression of data may involve applying a non-constant mantissa size. The mantissa size may be different for the values in each range FFT bin 310-313, and the selected mantissa size may depend on the amplitude of the signal stored in a range bin 310-313. Larger mantissa sizes may be used in cases where the amplitude in a range bin is large. A larger mantissa size results in a larger dynamic range without introducing additional quantization noise and therefore without masking weak signal components in a large signal. Because a large mantissa size may be used only for the range bins that contain large signals, which may be the case for a low number of bins, for the same quality of the end-result, the compression ratio can be higher than that of a compression scheme that uses a fixed mantissa size. Note that, mantissa sizes may be stored in a table in a memory in the compression unit.

An FMCW radar system may also function in a so-called multi-mode operation. During such a multi-mode operation, subsequent chirps may differ in terms of frequency band and duration because they belong to different modes. Another option is that in the so-called MIMO (Multiple Input Multiple Output) operating mode different parts of a scene may be illuminated or scanned by making use of multiple antennas. In the multi-mode operation, each of the chirps that belong to one particular mode and an appropriate mantissa size may be computed for each range bin. FIG. 3 shows exemplary mantissa sizes for such subsequent chirps of one particular mode, whereas for the other mode the mantissa sizes may be completely different. The key difference is that in multi-mode operation subsequent chirps of a chirp-train may have a different mantissa size because they belong to different modes. In advanced multi-mode systems, it may be that even more than two modes are used.

Figure 4:
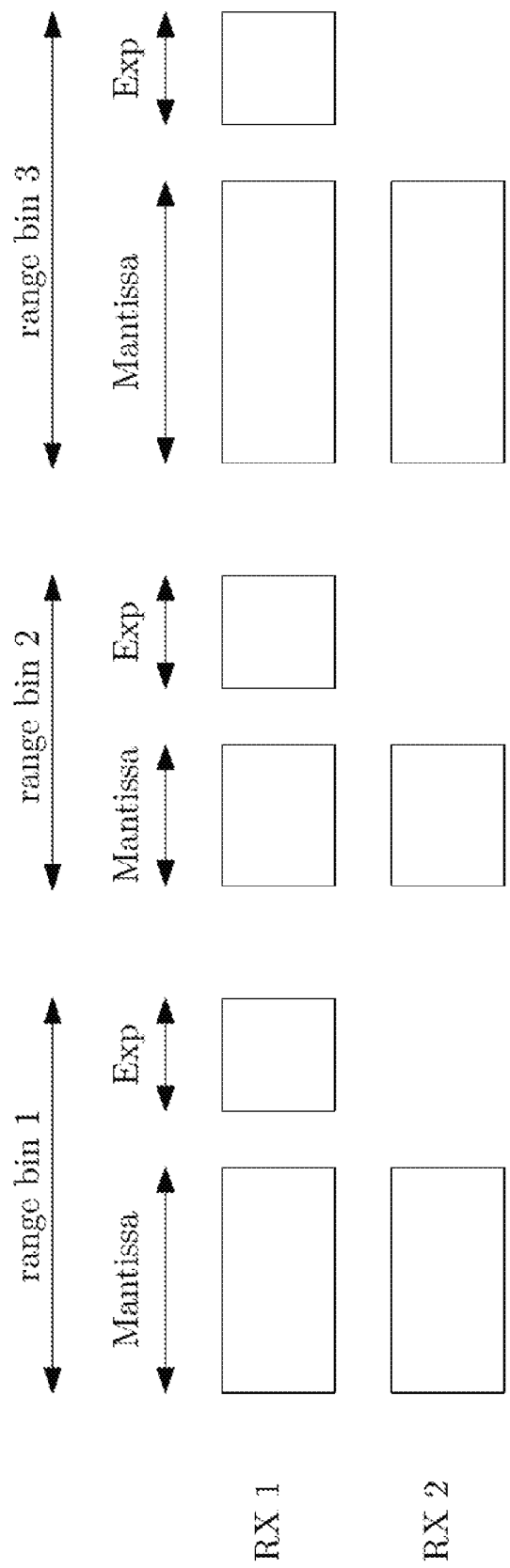
FIG. 4 is a block diagram illustrating an example of shared exponent and mantissa sizes in various range bins, for multiple (e.g., two or more) receive antennas, in accordance with the present disclosure.

Other examples according to the present disclosure are directed to using optimization where it is possible to use one exponent per group of floating-point numbers. Such optimization does not necessary introduce additional quantization noise or loss of dynamic range if the numbers have a related amplitude and therefore comparable. This may be the case if multiple receive antennas are used. FIG. 4 is a block diagram illustrating one example optimization with a shared exponent and same mantissa sizes in various range bins, for two receive antennas. In such examples, multiple antennas (e.g., two, three or several antenna) may be used in or with the related FMCW circuitries and/or radar transceivers to allow detection of the angle of arrival of a signal and, therefore, also the position of the target. The amplitudes or the respectively-received signals is similar because all receive (RX) antennas see the same target, and therefore each RX antenna receives a signal of an object with the same radar cross-section. In such optimization examples, a system similar to FIG. 1 is used, including memory circuitry and FFT circuitry to compress the representations and store the compressed representations in range bins of the memory circuitry. In the example illustrated by FIG. 4, the compressed data representation may have at least one of the variable-mantissa floating-point numbers with a mantissa value associated with an exponent value that is shared by or common to multiple range bins for different chirps or chirp sequences.

The size of the mantissa for each range bin may be determined using the received data of a few-several training chirps for each operation mode (a local memory such as 225 of FIG. 2 may be used to store temporarily data relating to such training chirps as part of a training procedure). The training chirps may be used to discern at which range or ranges there are potentially targets and only for these (indicated by larger peaks as discussed with FIG. 1), does the scheme anticipate a larger mantissa size. From this received data, for example, the variance for each of the data in each range bin, belonging to different chirps, is determined. After the mantissa size is determined the received data of the training, as well as subsequent chirps can be compressed. In connection with the present disclosure, it has been unexpectedly found that, often, the chirps belonging to the same so-called chirp train that result in the same range-Doppler image are compressed. After a chirp train, it is often assumed that targets have potentially been moved so much that again the mantissa sizes should be determined using a few of training chirps. Data representations from the training chirps may be stored in a memory circuit (e.g., L2 memory 240 and/or local memory 225 via a mini memory matrix cube) temporarily and then discarded after being used by the data processing circuit is to compress the representations via, for example, the variable-mantissa floating-point numbers. In such instances, one floating point number may have multiple mantissas and one shared exponent (e.g., as may occur if multiple Rx signals from different receiving antenna are compressed together).

Figure 5:
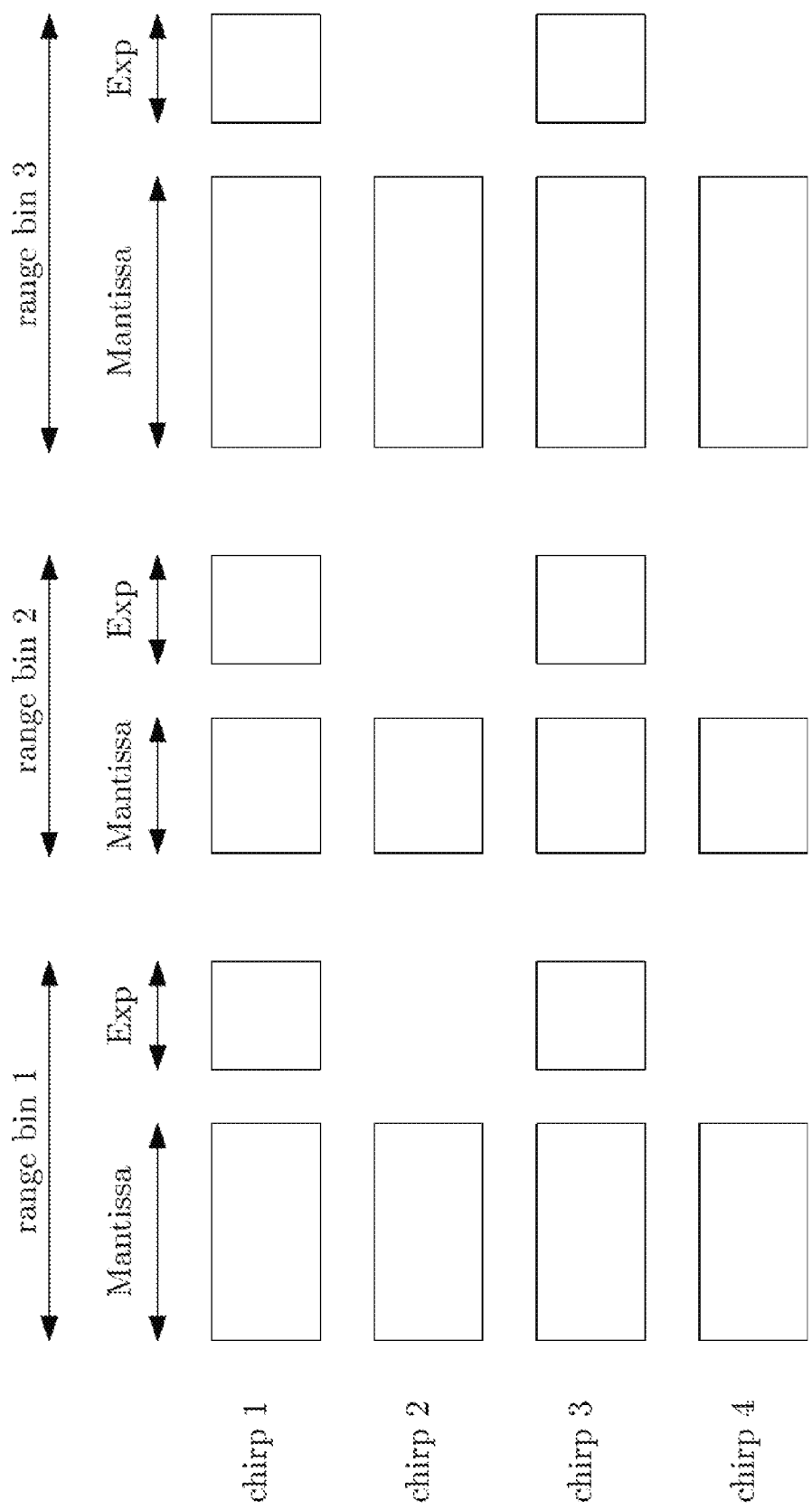
FIG. 5 is a block diagram illustrating an example of shared exponent and same mantissa sizes in various range bins, for different receive antennas and the same range bin, in accordance with the present disclosure.

In another example according to the present disclosure and also building on the above-discussed aspects, data from the same range bin of subsequent chirps may have a shared exponent and the same mantissa size. For example, in the case that only a few bits are used for encoding of the mantissa (e.g., 1 or 2 bit), the number of bits used for the exponent (5 bits) is relatively large. This is still the case if the exponent is already shared by data from different receiving antenna. In this example, 2*4*1=8 bits (2 because numbers are complex, 4 because 4 Rx antenna are assumed, 1 bit per mantissa) are used for the mantissas and 5 bits for the exponent which is still $5/13=38\%$ of the bits spend on the exponent. To reduce the overhead of the exponent, one common exponent for the data of the same range gate of two subsequent chirps may be used, as shown in FIG. 5. This is possible without a large penalty in quantization noise because, in certain instances, it is likely that the data of in the same range bin of subsequent chirps has a similar amplitude. This may be due to the scene having objects (in the field or view of the radar) does not change much after the short period of time between the (e.g., FMCW) chirps. The relative processing cost of this approach is that two chirps instead of one chirp may be buffered before data may be compressed, and that decompression results in two chirps. In certain implementations, due to there being a limited amount of local memory near a processor, there may be limits to which this approach can be generalized to even a larger number of chirps.

As an example, implementation consistent with instant disclosure, data processing circuit may include FFT circuitry to compress the representations, which may then be stored in memory. After sufficient data is collected data processing circuitry, such as a microcontroller or specialized computer (e.g., digital signal processor), may read the compressed data from memory and subsequently decompress it. The decompressed data may then be used to discerning a velocity associated one or more target of interest. Further, decompressed representations of the compressed representations can be used, along with a range-doppler map, to detect targets of interest based on at least two of the following: position, velocity, and angle of direction.

Other examples, also consistent with the present disclosure, include using memory circuitry and FFT (Fast Fourier Transform) circuitry to compress the representations and store the compressed representations in the memory circuitry, are implemented as part of a single integrated circuit chip. In yet another example implementation an apparatus is configured to discern a target from a noise floor which may involve a first FFT circuitry and having memory circuitry for storing representations of the range bins associated in a multiple axes storage array in the memory circuitry. A second FFT circuitry may involve use of another multiple axes storage array in memory for storing velocity-indicative data based on decompressing the compressed representations.

Certain further examples also consistent with the present disclosure are directed to the above issues and where memories and memory controllers may be optimized for a certain width of the data words (e.g., 64 bit), if less than 64 bits are read or written then additional clock cycles would be used, thereby reducing the memory bandwidth (in some cases even smaller than 64-bit words may not be supported by such memory controllers). These examples may be accommodated such that only 64-bit words are read and written and, even where there may be an issue that after compression the size of the floating point numbers is not a multiple of 64 bit, bits in the memory may be assigned in the memory word as unused. While this may effect a reduction of the compression ratio significantly, ways (consistent with the present disclosure) to address this include: using only certain mantissa sizes, and alternatively compressing data of the same range bin of multiple subsequent chirps and putting the compressed data in a single memory word. An example in this regard is the use of only 3, 5, 7, 11 bit mantissa sizes. For the 7 bit mantissa size, as this would result in 7b*4Rx*2Cplx+5exp=61 bit (7 bits, 4 antennas, 2 complex bits and 5 exponent bits), and therefore only 3 bits would be assigned as unused in the 64-bit memory word. However, for the 3 bit mantissa case this would result in 3b*4Rx*2Cplx+5exp=29 bits and, therefore, 35 bits would be disadvantageously unused in a 64-bit memory word. However, if data of the same range gate of 2 subsequent range gates is compressed then only 64-2*29=6 bit would remain unused. A downside of compressing and storing 2 range gates together is that data of 2 range gates is obtained after decompression which need to be stored in a memory near the processor. As a result, the number of range gates that can be compressed and stored together in (multiple) 64 bit memory words will be limited.

Also consistent with the present disclosure, a further example apparatus may involve a radar transceiver using a communication channel through which radar signals are transmitted and in response signals are received. Then the data processing includes differentiating a subset of representations of the received signals as being selected ones of the received signals that are more indicative of at least one target being with a given range than other ones of the received signals. Subsequently the representations may be compressed by using variable-mantissa floating-point numbers having mantissa values that vary based at least in part on at least one strength characteristic of the respective representations.

In yet further examples, certain of the above aspects may be included as an integral part of a sonar systems and/or a radio telescope receiver or transceiver, in which signals are transmitted and (reflected) signals are received via a communication channel. In these examples, the receiver part of the apparatus/system may include data processing circuitry that differentiates a subset of representations of the received signals. This differentiation may be used to select signals that are more indicative of one or more targets having a given range than other ones of the received signals. The processing (including compression and decompression) may be continue as described above. More specifically in certain such examples, the received signals' representations may then be compressed by using variable-mantissa floating-point numbers having mantissa values that vary based, at least in part, on at least one strength characteristic (e.g., amplitude, SNR, peak, etc.) of the respective representations.

Terms to exemplify orientation, such as upper/lower or left/right arrows to depict signal or processing flow (e.g., as in FIGS. 1 and 2), may be used herein to refer to relative positions of such flow as shown in the figures and may also be understood to be associated with signal/processing flow in both directions even where one-way direction may be shown (e.g., as with block 220 of FIG. 2). It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 110-170 and 220-255 of FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1 and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. An apparatus comprising:
   a radar transceiver to, via a communication channel, transmit radar signals and, in response, receive signals; and
   a data processing circuit to select, for compression, a subset of representations of the received signals that are more indicative of at least one target being within a given range relative to other representations of the received signals that are less indicative of the at least one target being within the given range, and to compress the selected subset of representations by using variable-mantissa floating-point numbers having mantissa values that vary based at least in part on at least one strength characteristic of the selected subset of the representations.

2. The apparatus of claim 1, further including memory circuitry, and wherein the radar transceiver is to store the selected subset of representations of the received signals in the memory circuitry before the data processing circuit is to compress the representations via the variable-mantissa floating-point numbers having mantissa values that vary based at least in part on at least one strength characteristic.

3. The apparatus of claim 1, wherein the data processing circuit includes FFT (Fast Fourier Transform) circuitry to compress the representations, and wherein said at least one strength characteristic includes one or a combination of the following: an amplitude assessment, a signal to noise assessment, and an assessment based on at least one peak parameter associated with the received signals.

4. The apparatus of claim 1, wherein the data processing circuit includes FFT (Fast Fourier Transform) circuitry to compress the representations and, after-data is collected for discerning a velocity associated with the at least one target, the data processing circuit is to decompress the compressed representations.

5. The apparatus of claim 1, further including memory circuitry and FFT (Fast Fourier Transform) circuitry to compress the representations and store the compressed representations in the memory circuitry and, after data is collected for discerning a velocity associated with the at least one target, the data processing circuit is to decompress the compressed representations, and wherein in response, the data processing circuit is further to use corresponding decompressed representations and a range-doppler map to detect the at least one target.

6. The apparatus of claim 1, wherein:
the data processing circuit is further to use corresponding decompressed representations of the compressed representations and a range-doppler map to detect the at least one target in terms of at least two of the following: position, velocity and angle of direction;
the received signals include signals reflected from a plurality of targets that include the at least one target within the given range; and
the selected subset of the representations are representations of the received signals that are more indicative of being reflections from ones of the plurality of targets that are within the given range, and the other representations of the received signals are less indicative of being reflections from the ones of the plurality of targets within the given range.

7. The apparatus of claim 1, further including memory circuitry and FFT (Fast Fourier Transform) circuitry to compress the representations and store the compressed representations in the memory circuitry, and wherein the memory circuitry and FFT are part of a single integrated circuit chip.

8. The apparatus of claim 1, further including memory circuitry and FFT (Fast Fourier Transform) circuitry to compress the representations and store the compressed representations in range bins of the memory circuitry, and wherein each of at least one of the variable-mantissa floating-point numbers is associated with an exponent value that is shared by or common to multiple ones of the range bins for different chirps or chirp sequences.

9. The apparatus of claim 1, further including memory circuitry having a temporary memory configuration to store the subset of representations of the received signals for use before the data processing circuit is to compress the representations via the variable-mantissa floating-point numbers, wherein for each of a plurality of range-based training operations in which the data processing circuit is to differentiate the subset of representations of the received signals, the subset of representations of the received signals is discarded from the temporary memory configuration in response to being used by the data processing circuit to compress the representations.

10. The apparatus of claim 1, further including memory circuitry, a first transform circuitry to compress the representations and store the compressed representations in range bins of the memory circuitry, and a second transform circuitry to decompress the compressed representations for detecting the at least one target.

11. The apparatus of claim 10, wherein the other representations of the received signals are more likely to be associated with noise than the selected ones, and wherein the first transform circuitry is further to use the memory circuitry for storing representations of the other ones and the select ones in the range bins associated with one of multiple axes of a storage array in the memory circuitry, and the second transform circuitry is further to use another of multiple axes of the storage array for storing velocity-indicative data based on decompressing the compressed representations.

12. The apparatus of claim 1, further including memory circuitry to compress the representations and store the compressed representations in range bins of the memory circuitry, wherein each of at least one of the variable-mantissa floating-point numbers is associated with an exponent value that is shared by or common to multiple ones of the range bins for different chirps or chirp sequences.

13. The apparatus of claim 1, wherein the radar transceiver is to transmit and receive Frequency-Modulated Continuous Wave (FMCW) radar signals, and wherein the mantissa values are limited as being selected from a set of predetermined mantissa sizes.

14. The apparatus of claim 1, wherein the radar transceiver is part of a Frequency-Modulated Continuous Wave (FMCW) radar system in which the radar transceiver is to transmit and receive FMCW radar signals, and the radar transceiver includes circuitry that is to compress the representations and store the compressed representations in range bins, and further to compress data associated with multiple subsequent chirps and to store the compressed data associated with multiple subsequent chirps in a single memory word.

15. A method comprising:
in a radar transceiver using a communication channel through which radar signals are transmitted and in response signals are received, selecting for compression a subset of representations of the received signals that are more indicative of at least one target being within a given range relative to other representations of the received signals that are less indicative of the at least one target being within the given range, and compressing the selected subset of representations by using variable-mantissa floating-point numbers having mantissa values that vary based at least in part on at least one strength characteristic of the selected representations.

16. The method of claim 15, wherein the radar transceiver includes a first transform circuitry that compresses the representations and stores the compressed representations in range bins, and wherein the radar transceiver includes a second transform circuitry that decompresses the compressed representations for detecting the at least one target.

17. The method of claim 15, wherein the radar transceiver stores the selected ones of the representations in the memory circuitry before the data processing circuit is to compress the representations via the variable-mantissa floating-point numbers having a mantissa values that vary based at least in part on at least one strength characteristic.

18. The method of claim 15, wherein the radar transceiver transmits and receives Frequency-Modulated Continuous Wave (FMCW) radar signals, and wherein the radar transceiver temporarily stores data representations of received signals from training chirps, to discern at which range or ranges there are potentially targets, in a memory circuit, and then discards the stored data representations after they are used by the radar transceiver to compress the data representations.

19. The method of claim 15, wherein the radar transceiver includes FFT (Fast Fourier Transform) circuitry that compresses the representations, wherein said at least one strength characteristic includes one or a combination of the following: an amplitude assessment, a signal to noise assessment, an assessment based on at least one peak parameter associated with the received signals, and wherein after data is collected for discerning a velocity associated with the at least one target, the radar transceiver decompresses the compressed representations.

20. The method of claim 15, wherein the radar transceiver includes a data processing circuit that uses corresponding decompressed representations of the compressed representations and a range-Doppler map to detect the at least one target in terms of at least two of the following: position, velocity and angle of direction.

* * * * *